United States Patent [19]

Amano et al.

[11] Patent Number: 5,416,149
[45] Date of Patent: May 16, 1995

[54] PULP-LIKE COMPOSITE MATERIAL AND PROCESS FOR PRODUCTION THEREOF

[75] Inventors: Satoshi Amano; Takahiko Ito, both of Tokyo, Japan

[73] Assignee: Nisshinbo Industries, Inc., Tokyo, Japan

[21] Appl. No.: 203,476

[22] Filed: Feb. 28, 1994

Related U.S. Application Data

[63] Continuation of Ser. No. 899,184, Jun. 16, 1992, abandoned.

[30] Foreign Application Priority Data

Jun. 21, 1991 [JP] Japan ................... 3-177252

[51] Int. Cl.$^6$ ............ C08J 5/10; C08K 3/30; C08L 79/08
[52] U.S. Cl. .................... 524/423; 524/425; 524/430; 524/494; 524/495; 524/589
[58] Field of Search .......... 524/423, 425, 430, 494, 524/495, 589

[56] References Cited

U.S. PATENT DOCUMENTS 3,755,242  8/1973  Reich ..................... 260/37 N
5,100,994  3/1992  Amano et al. ............. 528/44

Primary Examiner—Paul R. Michl
Assistant Examiner—U. K. Rajguru
Attorney, Agent, or Firm—Adduci, Mastriani, Schaumberg & Schill

[57] ABSTRACT

The present invention provides a pulp-like composite material free from the problems possessed by wood pulp and may be used as a possible substitute for asbestos, and a process for production thereof.

The pulp-like composite material of the present invention comprises (a) an inorganic material other than asbestos and (b) a polycarbodiimide, wherein the inorganic material (a) is substantially covered by the polycarbodiimide (b), or, the inorganic material (a) is substantially covered by the polycarbodiimide (b) and the coated inorganic material is connected to each other.

The process for producing a pulp-like composite material according to the present invention comprises dispersing an inorganic material other than asbestos in at least either of a polycarbodiimide solution and a precipitant and then mixing the resulting polycarbodiimide solution with the resulting precipitant while applying, as necessary, a shear force or a beating force.

11 Claims, 1 Drawing Sheet

PULP-LIKE COMPOSITE MATERIAL AND PROCESS FOR PRODUCTION THEREOF

This application is a continuation of application Ser. No. 07/899,184 filed Jun. 16, 1992 (now abandoned).

BACKGROUND OF THE INVENTION

1. Field of the Invention

The present invention relates to a pulp-like composite material and a process for production thereof. More particularly, the present invention relates to a pulp-like composite material excellent in heat resistance, electrical insulation, dimensional stability and mechanical properties, as well as to a process for production thereof.

2. Prior Art

Of pulp-like materials, wood pulp is best known. Wood pulp is widely used as various paper products and also is used in a large amount as electrical insulating papers, etc.

Wood pulp, however, not only possess big drawbacks of high hygroscopicity, low heat resistance, poor dielectric property, etc. but also are unable to satisfy the requirements (e.g. heat resistance, electrical insulation, dielectric property) for smaller-sized and lighter weight electric apparatuses and appliances, i.e. electric motor, generator, transformer, etc. of smaller size and lighter weight.

Meanwhile, asbestos is used in many applications such as friction material (which is used in, for example, the brake lining, clutch facing, etc. of automobile), high-temperature gasket, packing, filtering material, building material and the like. Asbestos has problems of future unavailability due to exhaustion of asbestos resource as natural mineral and adverse effect on health due to dust generation. Hence, various attempts have been made in order to develop a substitute material for asbestos. That is, in the field of, for example, a friction material, an attempt is under way to use, as a substitute component for asbestos, a fibrous material other than asbestos, such as glass fiber, steel fiber, rock wool, carbon fiber, aramid fiber or the like.

However, the above substitute fibers for asbestos, having no pulp-like structure as possessed by asbestos, have problems in miscibility with other friction material components, productivity, etc. in production of friction material; further, the friction materials using the above substitute fibers for asbestos are insufficient in friction properties, mechanical strengths, etc.

It was also attempted to produce a pulp-like material by mixing an above-mentioned substitute fiber for asbestos, with an inorganic substance powder using a rubber or a thermoplastic resin; however, the resulting pulp-like material has a low heat resistance of 200° C. or below and is insufficient. To improve the heat resistance, an aromatic polyamide was used as the resin; the resulting pulp-like composite material, however, was inferior in compatibility with other materials, adhesion, etc.

SUMMARY OF THE INVENTION

It is an object of the present invention to provide a pulp-like composite material free from the problems possessed by wood pulp, such as flammability and poor heat resistance, and a process for production thereof. It is another object of the present invention to provide a pulp-like composite material as a possible substitute for asbestos which has such problems as future unavailability due to resource exhaustion and adverse effect on health due to dust generation and which use may be restricted in the future, and a process for production thereof.

The pulp-like composite material employed in the present invention in order to achieve the above object comprises (a) an inorganic material other than asbestos and (b) a polycarbodiimide, wherein the inorganic material (a) is substantially covered by the polycarbodiimide (b), or comprises (a) an inorganic material other than asbestos and (b) a polycarbodiimide, wherein the inorganic material (a) is substantially covered by the polycarbodiimide (b) and the coated inorganic material is connected to each other.

The process for producing a pulp-like composite material, employed in the present invention in order to achieve the above object comprises dispersing an inorganic material other than asbestos in at least either of a polycarbodiimide solution or a liquid precipitant and then mixing the resulting polycarbodiimide solution with the resulting precipitant while applying, as necessary, a shear force or a beating force.

The present inventors made a study in order to solve the above-mentioned problems. As a result, the present inventors found that, for example, by adding a mixture of a polycarbodiimide solution and an inorganic material to a precipitant to give rise to precipitation and optionally applying beating, there can be obtained a pulp-like composite material comprising an inorganic material and a polycarbodiimide, wherein the inorganic material is covered by the polycarbodiimide or is covered by the polycarbodiimide and the coated inorganic material is connected to each other (agglomerated), that the pulp-like composite material can be made into a sheet excellent in electrical insulation, heat resistance, flame resistance, mechanical properties, etc., and that the pulp-like composite material has good miscibility with other components in the field of friction material, etc. and can be used as a substitute for asbestos. The present invention has been completed based on the above finding.

DETAILED DESCRIPTION OF THE INVENTION

Figure 1:
FIG. 1 is a microphotograph of the pulp-like composite material obtained in Example 1.

The present invention is hereinafter described in detail.

In the present invention, the pulp-like composite material is a composite material having a highly branched structure and a large surface area per unit volume. Viewed from the structure, the pulp-like composite material includes a type comprising (a) an inorganic material other than asbestos and (b) a polycarbodiimide, wherein the inorganic material (a) is substantially covered by the polycarbodiimide (b), and a type comprising (a) an inorganic material other than asbestos and (b) a polycarbodiimide, wherein the inorganic material (a) is substantially covered by the polycarbodiimide (b) and the components of the coated inorganic material such as a plurality of coated particles or fibers are connected to each other. Depending upon the condition of covering and the mode of connection, the pulp-like composite material takes the form of particles each having a highly branched structure, bars each having a highly branched structure, or bars each having a highly branched structure formed by the connection of said particles or said bars.

In the present invention, the inorganic material includes powdery or flaky materials such as alumina, silica, kaolin, clay, talc, mica, vermiculite, potassium carbonate, barium sulfate, magnesium sulfate, potassium titanate, wollastonite and the like; and fibrous materials such as glass fiber, rock wool, silica fiber, alumina fiber, kaolin fiber, ceramic fiber, metal fiber, boron fiber, magnesia fiber, potassium titanate fiber, titanium oxide fiber and the like. These materials can be used alone or in combination of two or more.

In the present invention, the polycarbodiimide can be exemplified by a polycarbodiimide obtained by subjecting an organic diisocyanate, preferably an aromatic diisocyanate to a condensation reaction in which decarboxylation also takes place. In this condensation reaction, it is possible to use a carbodiimidization catalyst, for example, a phosphorene oxide (e.g. 3-methylphosphorene oxide). As the organic diisocyanate, there can be mentioned, for example, an aromatic diisocyanate represented by the following formula

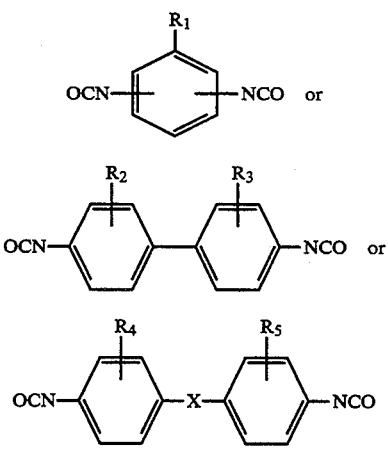

wherein $R_1$, $R_2$ and $R_3$ each represent a lower alkyl group or a lower alkoxy group; $R_4$ and $R_5$ each represent a hydrogen atom, a lower alkyl group or a lower alkoxy group; and X represents an oxygen atom or a methylene group. These aromatic diisocyanates can be used alone or in combination of two or more.

As the polymerization solvent used in the above polycarbodiimidization, there can be mentioned alicyclic ethers such as tetrahydrofuran, 1,4-dioxane, tetrahydropyran and the like. The above-mentioned organic diisocyanate is subjected to decarboxylation and condensation in the polymerization solvent, whereby a polycarbodiimide solution can be synthesized.

The amount of the inorganic material in the present pulp-like composite material is preferably 5-95% by weight. When the amount is less than 5% by weight, the properties possessed by the inorganic material are not exhibited in the pulp-like composite material. When the amount is more than 95% by weight, the polycarbodiimide solution, when mixed with the inorganic material, has low fluidity, making difficult the practical production of pulp-like composite material.

In producing the pulp-like composite material of the present invention, there can be employed a process which comprises dispersing an inorganic material in at least either of a polycarbodiimide solution or a precipitant and then mixing the resulting polycarbodiimide solution with the resulting precipitant. In this case, the inorganic material may be dispersed in the polycarbodiimide solution by adding the inorganic material to the polymerization solvent at the time of synthesis of polycarbodiimide solution.

The concentration of polycarbodiimide in polycarbodiimide solution is preferably 2-20% by weight, although the concentration varies depending upon the type of organic diisocyanate used in polycarbodiimide synthesis, the polymerization degree of polycarbodiimide, the amount of inorganic material added, and the type of polymerization solvent.

The precipitant used in production of the present pulp-like composite material is desirably a liquid which has miscibility with the polymerization solvent used in polycarbodiimide production but which is a non-solvent to the polycarbodiimide. As the precipitant, there can be mentioned, for example, water, alcohol type solvents and acetone. These precipitants can be used alone or in combination of two or more.

In producing the present pulp-like composite material, the polycarbodiimide solution and the precipitant can be added simultaneously and mixed; or, the polycarbodiimide solution can be added to the precipitant; or reversely, the precipitant can be added to the polycarbodiimide solution. In mixing the polycarbodiimide solution with the precipitant, stirring may be conducted in order to give rise to shearing or beating. Particularly in production of a pulp-like composite material whose fiber is short and thin, it is preferable to conduct stirring.

The pulp-like composite material of the present invention can be widely used not only in electrical insulating papers but also, for its excellent heat resistance, flame resistance and mechanical properties, as synthetic papers (e.g. wallpaper), friction materials (which are used in brake lining, clutch facing, etc.), high-temperature gaskets, packings, filtering media, battery separators, sound absorbing materials, shaped materials, etc.

The present invention is hereinafter described in detail by way of Examples.

EXAMPLE 1

Synthesis of polycarbodiimide solution

In a 1,000-ml four-necked flask provided with a heating means, a thermometer, a stirrer and a condenser, were placed 40 g of diphenylmethane diisocyanate and 707 ml of tetrahydrofuran (boiling point: 65°-68° C.). Stirring was conducted so as to give a uniform mixture. Thereto was added 0.01 g of 1-phenyl-3-methyl-2-phosphorene oxide as a catalyst. The resulting mixture was heated to a temperature at which tetrahydrofuran was refluxed, and kept at that temperature for 14 hours to obtain a tetrahydrofuran solution containing a polycarbodiimide.

Production of pulp-like composite material 90 g of a barium sulfate powder was added to the above obtained polycarbodiimide solution. The mixture was stirred to obtain a uniform dispersion. 1,000 ml of water was placed in a mixer and stirred. Thereinto was gradually poured the uniform dispersion (a polycarbodiimide solution containing barium sulfate dispersed therein). Stirring was conducted for about 3 minutes, and the dispersion was fed into a nutsche type vacuum filter to obtain a pulp-like composite material by filtration. Incidentally, the filtrate was transparent and substantially no barium sulfate was detected in the filtrate.

Then, thorough water washing was conducted using the same nutsche type vacuum filter. The thus obtained pulp-like material comprising barium sulfate and a polycarbodiimide was a good pulp-like composite material having a highly branched structure. The microphotograph of the material is shown in FIG. 1.

The pulp-like composite material was made into a sheet, dried at 100° C. and hot-pressed under the conditions of 200° C. and 100 kg/cm² to obtain a sheet. The sheet had the following tensile strength and was good.

Tensile strength = 7.5 kg/cm²

COMPARATIVE EXAMPLE 1

A pulp-like material was obtained in the same manner as in Example 1, except that the polycarbodiimide solution was changed to an N,N-dimethylformamide solution containing a polyparaphenylene isophthalamide. The pulp-like material was made into a sheet, dried at 100° C. and hot-pressed under the conditions of 200° C. and 100 kg/cm² to obtain a sheet. The sheet had the following tensile strength and was insufficient.

Tensile strength = 4.5 kg/cm².

EXAMPLE 2

500 ml of the polycarbodiimide solution obtained in Example 1 and 90 g of barium sulfate were placed in a mixer. Stirring was conducted so as to give a uniform dispersion. Into the uniform dispersion was poured 1,000 ml of water as a precipitant to precipitate a polycarbodiimide. Stirring was conducted for about 3 minutes. The mixture was fed into a nutsche type vacuum filter to obtain a pulp-like composite material by filtration. Incidentally, the filtrate was transparent and substantially no barium sulfate was detected in the filtrate. Then, thorough water washing was conducted using the same nutsche type vacuum filter.

The thus obtained pulp-like material comprising barium sulfate and a polycarbodiimide was a good pulp-like composite material having a highly branched structure.

EXAMPLE 3

1,000 ml of water and 90 g of barium sulfate were placed in a mixer and stirred. Thereinto was gradually poured the polycarbodiimide solution obtained in Example 1. Stirring was conducted for about 3 minutes. The mixture was fed into a nutsche type vacuum filter to obtain a pulp-like composite material by filtration. Incidentally, the filtrate was transparent and substantially no barium sulfate was detected in the filtrate. Then, thorough water washing was conducted using the same nutsche type vacuum filter.

The thus obtained pulp-like material comprising barium sulfate and a polycarbodiimide was a good pulp-like composite material having a highly branched structure.

EXAMPLE 4

There was employed the same procedure for synthesis of polycarbodiimide solution as in Example 1, except that 90 g of barium sulfate was placed in the four-necked flask before heating. 500 ml of the resulting polycarbodiimide solution containing barium sulfate dispersed therein was gradually poured into 1,000 ml of water contained in a mixer with stirring. Stirring was conducted for about 3 minutes, and the dispersion was fed into a nutsche type vacuum filter to obtain a pulp-like composite material by filtration. Incidentally, the filtrate was transparent and substantially no barium sulfate was detected in the filtrate. Then, thorough water washing was conducted using the same nutsche type vacuum filter.

The thus obtained pulp-like composite material comprising barium sulfate and a polycarbodiimide was a good pulp-like composite material having a highly branched structure.

EXAMPLE 5

500 ml of the polycarbodiimide solution containing barium sulfate dispersed therein, obtained in Example 4, was placed in a mixer and stirred. Then, 1,000 ml of water as a precipitant was poured into the mixer to precipitate a polymer. Stirring was conducted for about 3 minutes, and the dispersion was fed into a nutsche type vacuum filter to obtain a pulp-like composite material by filtration. Incidentally, the filtrate was transparent and substantially no barium sulfate was detected in the filtrate. Then, thorough water washing was conducted using the same nutsche type vacuum filter.

The thus obtained pulp-like composite material comprising barium sulfate and a polycarbodiimide was a good pulp-like composite material having a highly branched structure.

EXAMPLE 6

90 g of barium sulfate was added to 500 ml of the polycarbodiimide solution obtained in Example 1. Stirring was conducted so as to give a uniform dispersion. The uniform dispersion was placed in a plate-like container. Hot water of 90° C. as a precipitant was poured into the dispersion placed in a plate-like container to precipitate a polymer. The system was allowed to stand until the temperature became room temperature. The precipitate was separated from a mixture of water and tetrahydrofuran by pressing, then dried at 100° C., and beaten by a Pallman type mill to obtain a pulp-like composite material.

The thus obtained pulp-like composite material comprising barium sulfate and a polycarbodiimide was a good pulp-like composite material having a highly branched structure.

EXAMPLE 7

Pulp-like composite materials were obtained in the same manners as in Examples 1 to 6, except that the barium sulfate was changed to mica.

Each material had a highly branched structure and was a good pulp-like composite material.

EXAMPLE 8

Pulp-like composite materials were obtained in the same manners as in Examples 1 to 6, except that the barium sulfate was changed to a barium sulfate-mica mixture (1:1 by weight).

Each material had a highly branched structure and was a good pulp-like composite material.

EXAMPLE 9

Pulp-like composite materials were obtained in the same manners as in Examples 1 to 6, except that the barium sulfate was changed to rock wool.

Each material had a highly branched structure and was a good pulp-like composite material.

EXAMPLE 10

Pulp-like composite materials were obtained in the same manners as in Examples 1 to 6, except that the barium sulfate was changed to a mica-rock wool mixture (1:1 by weight).

Each material had a highly branched structure and was a good pulp-like composite material.

What is claimed is:

1. A pulp-like composite material comprising (a) an inorganic material other than asbestos and (b) a polycarbodiimide, wherein the inorganic material (a) is substantially covered by the polycarbodiimide (b), said polycarbodiimide being produced by subjecting an aromatic diisocyanate selected from the group consisting of aromatic diisocyanates having the formula:

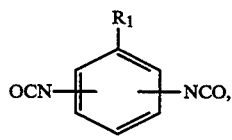

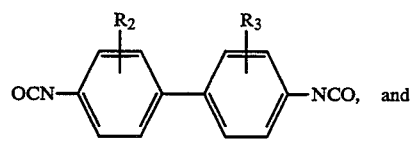

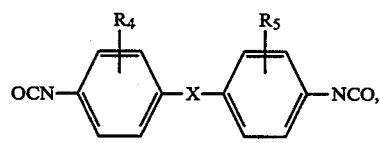

where $R_1$, $R_2$ and $R_3$ each represent a lower alkyl group or a lower alkoxy group, $R_4$ and $R_5$ each represent a hydrogen atom, a lower alkyl group or a lower alkoxy group; and X represents an oxygen atom or a methylene group, and mixtures thereof to decarboxylation and condensation.

2. A pulp-like composite material comprising (a) an inorganic material other than asbestos and (b) a polycarbodiimide, wherein the inorganic material (a) is substantially covered by the polycarbodiimide (b) and the coated inorganic material is connected with each other, said polycarbodiimide being produced by subjecting an aromatic diisocyanate selected from the group consisting of aromatic diisocyanates having the formula:

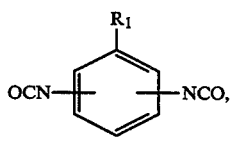

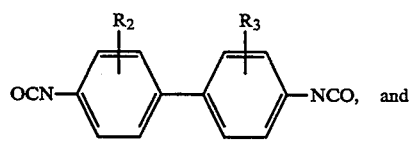

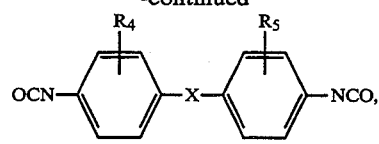

where $R_1$, $R_2$ and $R_3$ each represent a lower alkyl group or a lower alkoxy group, $R_4$ and $R_5$ each represent a hydrogen atom, a lower alkyl group or a lower alkoxy group; and X represents an oxygen atom or a methylene group, and mixtures thereof to decarboxylation and condensation.

3. A pulp-like composite material according to claim 1 or 2, wherein the inorganic material is powdery, flaky or fibrous.

4. A pulp-like composite material according to claim 1 or 2, wherein the content of the inorganic material is 5–95% by weight based on the pulp-like composite material.

5. A process for producing a pulp-like composite material, which comprises providing a polycarbodiimide solution and a precipitant for the polycarbodiimide, dispersing an inorganic material other than asbestos in at least one of the polycarbodiimide solution and the precipitant and then mixing the polycarbodiimide solution with the precipitant, said polycarbodiimide solution being produced by subjecting an aromatic diisocyanate selected from the group consisting of aromatic diisocyanates having the formula:

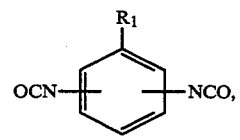

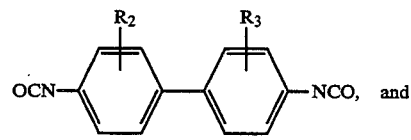

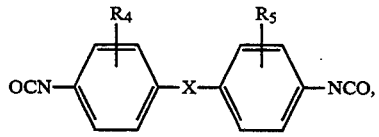

where $R_1$, $R_2$ and $R_3$ each represent a lower alkyl group or a lower alkoxy group, $R_4$ and $R_5$ each represent a hydrogen atom, a lower alkyl group or a lower alkoxy group; and X represents an oxygen atom or a methylene group, and mixtures thereof to decarboxylation and condensation in a polymerization solvent.

6. A process for producing a pulp-like composite material, which comprises providing a polycarbodiimide solution and a precipitant for the polycarbodiimide, dispersing an inorganic material other than asbestos in at least one of the polycarbodiimide solution and the precipitant and then mixing the polycarbodiimide solution with the precipitant while applying a shear force or a beating force, said polycarbodiimide solution being produced by subjecting an aromatic diisocyanate selected from the group consisting of aromatic diisocyanates having the formula:

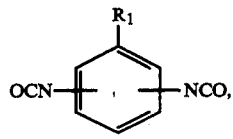

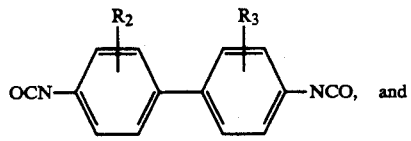  and

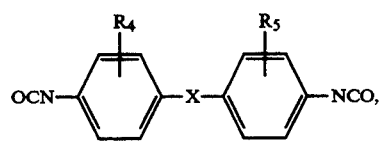

where $R_1$, $R_2$ and $R_3$ each represent a lower alkyl group or a lower alkoxy group, $R_4$ and $R_5$ each represent a hydrogen atom, a lower alkyl group or a lower alkoxy group; and X represents an oxygen atom or a methylene group,
and mixtures thereof to decarboxylation and condensation in a polymerization solvent.

7. A process for producing a pulp-like composite material according to claim 5 or 6, wherein the polycarbodiimide solution contains a polycarbodiimide in a concentration of 2–20% by weight.

8. A process for producing a pulp-like composite material according to claim 5 or 6, wherein an inorganic material other than asbestos is dispersed in the polymerization solvent prior to polycarbodiimidization, so that the inorganic material other than asbestos is dispersed in the polycarbodiimide solution.

9. A process for producing a pulp-like composite material according to claim 5 or 6, wherein the inorganic material is powdery, flaky or fibrous.

10. A process for producing a pulp-like composite material according to claim 5 or 6, wherein the content of the inorganic material is 5–95% by weight based on the pulp-like composite material.

11. A process for producing a pulp-like composite material according to claim 5 or 6, wherein the polycarbodiimide solution is a solution of a polycarbodiimide in an alicyclic ether.

* * * * *